US012792710B2

(12) United States Patent
Tsou

(10) Patent No.: US 12,792,710 B2
(45) Date of Patent: Nov. 10, 2026

(54) VEHICLE-MOUNTED SYSTEM AND OPERATION METHOD THEREOF

(71) Applicant: DeCloak Intelligences Co., Taipei City (TW)

(72) Inventor: Yao-Tung Tsou, Taipei City (TW)

(73) Assignee: DeCloak Intelligences Co., Taipei City (TW)

( * ) Notice: Subject to any disclaimer, the term of this patent is extended or adjusted under 35 U.S.C. 154(b) by 246 days.

(21) Appl. No.: 18/508,181

(22) Filed: Nov. 13, 2023

(65) Prior Publication Data

US 2024/0202300 A1 Jun. 20, 2024

Related U.S. Application Data

(60) Provisional application No. 63/542,534, filed on Oct. 5, 2023, provisional application No. 63/434,911, filed (Continued)

(51) Int. Cl.
*G06F 21/32* (2013.01)

(52) U.S. Cl.
CPC .................................... *G06F 21/32* (2013.01)

(58) Field of Classification Search
CPC .......... G06F 21/30; G06F 21/31; G06F 21/32; G06F 21/33; G06F 21/6254
See application file for complete search history.

(56) References Cited

U.S. PATENT DOCUMENTS 8,311,973 B1 11/2012 Zadeh
2014/0337634 A1 11/2014 Starner et al.
(Continued)

FOREIGN PATENT DOCUMENTS

CN 109377628 2/2019
CN 109769105 5/2019
(Continued)

OTHER PUBLICATIONS

"Office Action of Japan Related Application, Application No. 2024063400", issued on May 20, 2025, p. 1-p. 3.
(Continued)

*Primary Examiner* — Erin M Piateski
*Assistant Examiner* — John C Merino
(74) *Attorney, Agent, or Firm* — WPAT, PC

(57) ABSTRACT

A vehicle-mounted system and an operation method thereof are provided. The vehicle-mounted system includes a data acquisition device, a biometric feature acquisition device and a processor. The data acquisition device is configured to acquire a self-key generated by performing de-identification processing on a first biometric feature of a user using a vehicle to obtain first de-identified data, and transform the first de-identified data into a first feature vector including first de-identified features. The biometric feature acquisition device is configured to acquire a second biometric feature of a current user to be recognized. The processor is configured to perform de-identification processing on the second biometric feature to obtain second de-identified data, transform the second de-identified data into a second feature vector including second de-identified features, compare the second feature vector with the first feature vector in the self-key, and activate a predetermined function of the vehicle according to a comparison result.

18 Claims, 8 Drawing Sheets

Related U.S. Application Data on Dec. 22, 2022, provisional application No. 63/425,274, filed on Nov. 14, 2022.

(56) References Cited

U.S. PATENT DOCUMENTS

| | | | | |
|---|---|---|---|---|
| 2017/0180125 | A1 | 6/2017 | Bobinski | |
| 2019/0031145 | A1* | 1/2019 | Trelin | G06Q 20/40145 |
| 2019/0280869 | A1* | 9/2019 | Streit | G06N 3/08 |
| 2020/0254974 | A1 | 8/2020 | Gordon et al. | |
| 2021/0200851 | A1 | 7/2021 | Perry et al. | |
| 2021/0229633 | A1* | 7/2021 | DeLong | B60R 25/22 |
| 2021/0403017 | A1* | 12/2021 | Bielby | B60W 50/085 |
| 2022/0237317 | A1 | 7/2022 | Kim et al. | |
| 2023/0076017 | A1 | 3/2023 | Choi | |
| 2023/0222843 | A1* | 7/2023 | Zhu | G06V 40/172 713/186 |
| 2024/0022601 | A1 | 1/2024 | Yennapureddy | |
| 2024/0153326 | A1 | 5/2024 | Saito et al. | |

FOREIGN PATENT DOCUMENTS

| | | |
|---|---|---|
| CN | 105184277 | 2/2020 |
| CN | 111046422 | 3/2021 |
| CN | 113935915 | 1/2022 |
| CN | 111476200 | 4/2022 |
| CN | 114697464 | 7/2022 |
| CN | 114817986 | 7/2022 |
| CN | 114936377 | 8/2022 |
| CN | 114998971 | 9/2022 |
| CN | 115050131 | 9/2022 |
| JP | 2020144443 | 9/2020 |
| KR | 20200014889 A | 2/2020 |
| KR | 20220124288 A | 9/2022 |
| KR | 20230030251 A | 3/2023 |
| TW | 201913451 | 4/2019 |
| TW | M615254 | 8/2021 |
| TW | M620132 | 11/2021 |
| TW | I768625 | 6/2022 |
| TW | 202226047 | 7/2022 |
| TW | 202236163 | 9/2022 |
| WO | 2021091661 | 5/2021 |

OTHER PUBLICATIONS

"Office Action of U.S. Related Application, U.S. Appl. No. 18/462,410", issued on May 21, 2025, p. 1-p. 17.

"Office Action of U.S. Related Application, U.S. Appl. No. 18/508,232", issued on May 30, 2025, p. 1-p. 18.

"Office Action of Taiwan Related Application, Application No. 112128407", issued on Jun. 13, 2025, p. 1-p. 10.

"Office Action of Taiwan Related Application, Application No. 112141279", issued on Jun. 17, 2025, p. 1-p. 21.

"Office Action of Taiwan Related Application, Application No. 112127136", issued on Jun. 18, 2025, p. 1-p. 15.

"Office Action of Taiwan Related Application, Application No. 112143712", issued on Aug. 7, 2024, p. 1-p. 6.

"Office Action of Taiwan Related Application, Application No. 112128407", issued on Aug. 21, 2024, p. 1-p. 5.

"Office Action of U.S. related Application, U.S. Appl. No. 18/461,517", issued on Sep. 15, 2025, p. 1-p. 16.

Newton et al, "Preserving Privacy by De-Identifying Face Images", IEEE Transactions on Knowledge and Data Engineering ( vol. 17, Issue: 2, Feb. 2005).

"Office Action of Taiwan related Application, Application No. 112128407", issued on Oct. 1, 2025, p. 1-p. 10.

Li Ping-Xi, "A Hybrid Face Recognition System Based on Mutual Correction of Classification Models Trained by Two Deep Neural Networks Graduate", Southern Taiwan University of Science and Technology Master's Thesis, Date of Thesis Publication: Apr. 19, 2022.

"Office Action of U.S. related Application, U.S. Appl. No. 18/508,198", issued on Nov. 7, 2025, p. 1-p. 15.

"Office Action of Korea. related Application, Application No. 10-2024-0062498", issued on Nov. 12, 2025, p. 1-p. 7.

Arnaud Grivet Sebert, Combining differential privacy and homomorphic encryption for privacy-preserving collaborative machine learning, Doctoral thesis from Paris-Saclay University, defended at Paris-Saclay on Jun. 12, 2023.

"Office Action of Taiwan Related Application Application No. 113148206", issued on Dec. 26, 2025, p. 1-p. 8.

"Office Action of China Related Application Application No. 202311448600.X", issued on Mar. 17, 2026, p. 1-p. 9.

* cited by examiner

VEHICLE-MOUNTED SYSTEM AND OPERATION METHOD THEREOF

CROSS-REFERENCE TO RELATED APPLICATION

This application claims the priority benefit of U.S. provisional application Ser. No. 63/425,274, filed on Nov. 14, 2022, U.S. provisional application Ser. No. 63/434,911, filed on Dec. 22, 2022, and U.S. provisional application Ser. No. 63/542,534, filed on Oct. 5, 2023. The entirety of each of the above-mentioned patent applications is hereby incorporated by reference herein and made a part of this specification.

BACKGROUND

Technical Field

The present disclosure relates to an identification system and method, and in particular to a vehicle-mounted system and an operation method thereof.

Description of Related Art

The current status of facial recognition technology used in Driver Monitoring System (DMS) has raised concerns about data security and privacy leaks. Traditional recognition methods are to outsource sensitive facial data to a central server, or to execute distributed models for local use.

However, outsourcing solutions often have the risk of data leakage and may reveal the identity of the car owner because user data is exposed to third-party service providers or unsecured execution environments.

On the other hand, although local solutions may protect the privacy of car owners to a certain extent, they still have the risk of privacy leakage due to the device being damaged, and are limited in terms of scalability, flexibility, and power consumption.

SUMMARY

The present disclosure provides a vehicle-mounted system and an operation method thereof, capable of performing car owner identity verification without leaking privacy.

The present disclosure provides a vehicle-mounted system disposed in a vehicle. The vehicle-mounted system includes a data acquisition device, a first biometric feature acquisition device, and a processor. The data acquisition device is configured to acquire a registered self-key, in which the self-key is generated by performing de-identification processing on a first biometric feature of a user using the vehicle to obtain a first de-identified data, and transforming the first de-identified data into a first feature vector including a plurality of first de-identified features. The first biometric feature acquisition device is configured to acquire a second biometric feature of a current user to be recognized. The processor is coupled to the data acquisition device and the first biometric feature acquisition device, and configured to perform the de-identification processing on the second biometric feature to obtain a second de-identified data, transform the second de-identified data into a second feature vector including a plurality of second de-identified features, compare the second feature vector with the first feature vector in the self-key, and activate a predetermined function of the vehicle according to a comparison result.

In some embodiments, the vehicle-mounted system further comprises a storage device for storing the self-key. The processor acquires, by using a second biometric feature acquisition device, the first biometric feature of the user using the vehicle, performs the de-identification processing on the first biometric feature to obtain the first de-identified data, transforms the first de-identified data into the first feature vector including the plurality of first de-identified features, and stores the first feature vector as the self-key in the storage device.

In some embodiments, the vehicle-mounted system further comprises a communication device for acquiring the self-key from a mobile device of the user using the vehicle through wired communication or wireless communication. The mobile device acquires, by using a second biometric feature acquisition device, the first biometric feature of the user using the vehicle, performs the de-identification processing on the first biometric feature to obtain the first de-identified data, and transforms the first de-identified data into the first feature vector including the plurality of first de-identified features to generate the self-key.

In some embodiments, the vehicle-mounted system further comprises a card reader for acquiring the self-key from a portable storage device of the user using the vehicle. The self-key is generated by a computer device of the user using the vehicle through acquiring, by using a second biometric feature acquisition device, the first biometric feature of the user using the vehicle, performs the de-identification processing on the first biometric feature to obtain the first de-identified data, and transforms the first de-identified data into the first feature vector including the plurality of first de-identified features, and is written into the portable storage device.

In some embodiments, the processor recognizes an identify of the current user according to the comparison result, and activates the predetermined function of the vehicle allowed to be used in authorization data according to the authorization data set in advance.

In some embodiments, the processor further monitors a variation of the second biometric feature to determine a state of the current user, and activates an other predetermined function of the vehicle according to a determination result.

In some embodiments, the first biometric feature acquisition device is configured outside the vehicle to acquire a third biometric feature of an external user, in which the processor further performs the de-identification processing on the third biometric feature to obtain a third de-identified data, transforms the third de-identified data into a third feature vector including a plurality of third de-identified features, compares the third feature vector with the first feature vector in the self-key, and opens a door of the vehicle according a comparison result.

In some embodiments, the processor further employs a deep learning model that supports a privacy protection technology to perform the de-identification processing on the second biometric feature. The deep learning model comprises a plurality of neurons divided into multiple layers, the second biometric feature is transformed into feature values of a plurality of neurons at a layer among the multiple layers, and the transformed feature value of each of the neurons is added to a noise generated using a privacy parameter and then input into a next layer, after the multiple layers of processing, the second de-identified data is obtained.

In some embodiments, the processor further employs a biometric identification technology to identify a living body in the second biometric feature, and, when identifying that there is the living body in the second biometric feature, performs the de-identification processing on the second biometric feature, in which the biometric identification technology comprises a blink detection, deep learning features, a challenge-response technology or a three-dimensional stereo camera.

The present disclosure provides an operation method of a vehicle-mounted system, adapted for a vehicle-mounted system which is disposed in a vehicle and includes a data acquisition device, a first biometric feature acquisition device, and a processor. The method includes the following steps: acquiring, by the data acquisition device, a registered self-key, in which the self-key is generated by performing de-identification processing on a first biometric feature of a user using the vehicle to obtain a first de-identified data, and transforming the first de-identified data into a first feature vector including a plurality of first de-identified features; acquiring, by the first biometric feature acquisition device, a second biometric feature of a current user to be recognized; and performing, by the processor, the de-identification processing on the second biometric feature to obtain a second de-identified data, transforming the second de-identified data into a second feature vector including a plurality of second de-identified features, comparing the second feature vector with the first feature vector in the self-key, and activating a predetermined function of the vehicle according to a comparison result.

In some embodiments, the vehicle-mounted system further includes a storage device storing the self-key, and the method further acquires, by using a second biometric feature acquisition device, the first biometric feature of the user using the vehicle, performs the de-identification processing on the first biometric feature to obtain the first de-identified data, transforms the first de-identified data into the first feature vector including the plurality of first de-identified features, and stores the first feature vector as the self-key in the storage device.

In some embodiments, the vehicle-mounted system further includes a communication device, and the method further acquires, by the communication device, the self-key from a mobile device of the user using the vehicle through wired communication or wireless communication, in which the mobile device acquires, by using a second biometric feature acquisition device, the first biometric feature of the user using the vehicle, performs the de-identification processing on the first biometric feature to obtain the first de-identified data, and transforms the first de-identified data into the first feature vector including the plurality of first de-identified features to generate the self-key.

In some embodiments, the data acquisition device comprises a card reader, and the method further acquires, by the card reader, the self-key from a portable storage device of the user using the vehicle, in which the self-key is generated by a computer device of the user using the vehicle through acquiring, by using a second biometric feature acquisition device, the first biometric feature of the user using the vehicle, performing the de-identification processing on the first biometric feature to obtain the first de-identified data, and transforming the first de-identified data into the first feature vector including the plurality of first de-identified features, and is written into the portable storage device.

In some embodiments, the step of activating, by the processor, the predetermined function of the vehicle according to the comparison result includes recognizing, by the processor, an identify of the current user according to the comparison result, and activating the predetermined function of the vehicle allowed to be used in authorization data according to the authorization data set in advance.

In some embodiments, the method further includes monitoring, by the processor, a variation of the second biometric feature to determine a state of the current user, and activating an other predetermined function of the vehicle according to a determination result.

In some embodiments, the first biometric feature acquisition device is disposed outside the vehicle, and the method further includes acquiring, by the processor using the first biometric feature acquisition device, a third biometric feature of an external user; and performing, by the processor, the de-identification processing on the third biometric feature to obtain a third de-identified data, transforming the third de-identified data into a third feature vector including a plurality of third de-identified features, comparing the third feature vector with the first feature vector in the self-key, and opening a door of the vehicle according a comparison result.

In some embodiments, the step of performing, by the processor, the de-identification processing on the second biometric feature to obtain the second de-identified data includes employing, by the processor, a deep learning model that supports a privacy protection technology to perform the de-identification processing on the second biometric feature.

In some embodiments, the deep learning model comprises a plurality of neurons divided into multiple layers, the second biometric feature is transformed into feature values of a plurality of neurons at a layer among the multiple layers, and the transformed feature value of each of the neurons is added to a noise generated using a privacy parameter and then input into a next layer, after the multiple layers of processing, the second de-identified data is obtained.

In some embodiments, the method further includes employing, by the processor, a biometric identification technology to identify a living body in the second biometric feature, and, when identifying that there is the living body in the second biometric feature, performing the de-identification processing on the second biometric feature, in which the biometric identification technology comprises a blink detection, deep learning features, a challenge-response technology or a three-dimensional stereo camera.

Based on the above, the vehicle-mounted system and the operation method thereof of the present disclosure perform de-identification processing on the biometric feature of a user of a vehicle, transform the de-identified data into a feature vector, and store the feature vector as a self-key in a mobile device or a portable storage device carried by the user such that when the user intends to open a door of the vehicle or activate the vehicle, the user can perform identity verification through acquisition of biometric feature and comparison of feature vectors, so as to activate a predetermined function of the vehicle. As a result, it helps reduce the risk of privacy leaks and system maintenance costs.

In order to make the above-mentioned features and advantages of the present disclosure more clear and easy to understand, embodiments are given below and described in detail with reference to the attached drawings.

DESCRIPTION OF THE EMBODIMENTS

The embodiment of the present disclosure provides a solution for the current Driver Monitoring System (DMS), in which, through performing irreversible de-identification on the biometric feature data such as faces or fingerprints, the disclosure ensures that even if the vehicle-mounted system is compromised, hackers cannot reconstruct the biometric feature data or identify the car owner. This not only enhances data security but also protects personal privacy. Therefore, the vehicle-mounted system of the embodiment of the present disclosure can provide high-precision feature identification while protecting data security and personal privacy.

Figure 1:
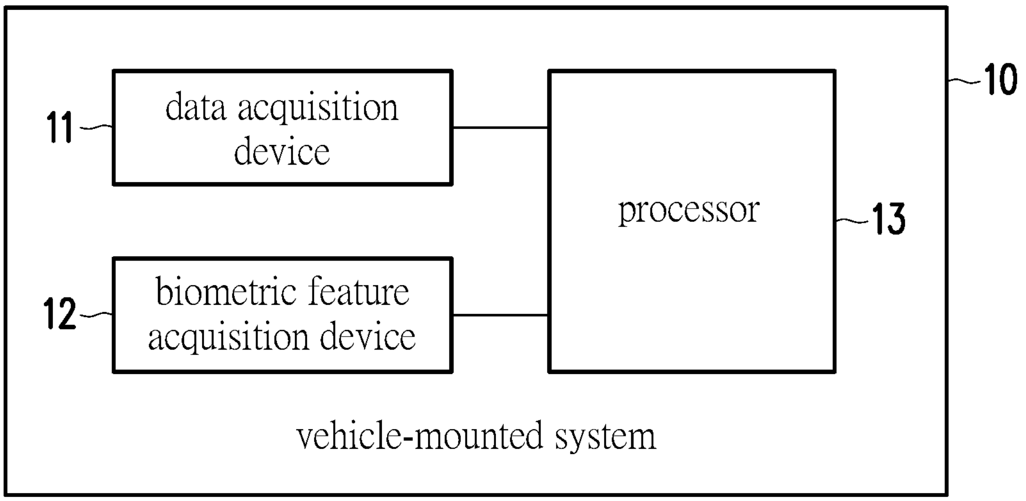
FIG. 1 is a block diagram of a vehicle-mounted system 10 according to an embodiment of the present disclosure.

FIG. 1 is a block diagram of a vehicle-mounted system 10 according to an embodiment of the present disclosure. Referring to FIG. 1, the vehicle-mounted system 10 of the embodiment is, for example, disposed in DMS, Advanced Driver Assistance System (ADAS), drowsiness warning system, On Board Diagnostics (OBD), Lane Departure Warning System (LDWS), Forward Collision Warning System (FCWS) or Rear Collision Warning System (RCWS), or an in-vehicle infotainment system that integrates some or all of the above systems. The vehicle-mounted system 10 includes a data acquisition device 11, a biometric feature acquisition device 12 and a processor 13.

The data acquisition device 11 is, for example, a communication device that supports communication protocols such as wireless fidelity (Wi-Fi), Wi-Fi direct, radio frequency identification (RFID), Bluetooth, infrared, near-field communication (NFC) or device-to-device (D2D), or a network connection device that supports Internet connection, and is configured to perform communication or network connect with an external device (not shown) and acquire data from the external device.

In some embodiments, the data acquisition device 11 is, for example, a Universal Serial Bus (USB), a chip card reader or a memory card reader, and can be used to read data stored in a flash drive, a memory card such as Secure Digital Memory Card (SD Card), or a portable storage device (not shown) such as a chip card, which is not limited herein.

The biometric feature acquisition device 12 is, for example, an image capturing device, which includes a charge coupled device (CCD), a complementary metal-oxide semiconductor (CMOS) device or other types of photosensitive devices that are able to sense light intensity to generate an image of an image capturing scene. In some embodiments, the image capturing device further includes an image signal processor (ISP), which may process the captured images.

In other embodiments, the biometric feature capturing device 12 may also be a sensor for detecting biometric features such as the user's voice, fingerprints, palm prints, iris, retina, veins, etc., so that the processor 13 is able to realize biometric feature identification such as voice identification, fingerprint identification, palm print identification, iris identification, retina identification, vein identification, etc. based on the sensing results, and the present disclosure is not limited thereto.

The processor 13 is, for example, a central processing unit (CPU), or other programmable general-purpose or special-purpose microprocessor, a microcontroller, a digital signal processor (DSP), a programmable controller, an application specific integrated circuit (ASIC), a programmable logic device (PLD) or other similar devices or a combination of the devices, and the present disclosure is not limited thereto. In this embodiment, the processor 13 may load a computer program so as to execute the operation method of the vehicle-mounted system in the embodiment of the present disclosure.

Figure 2:
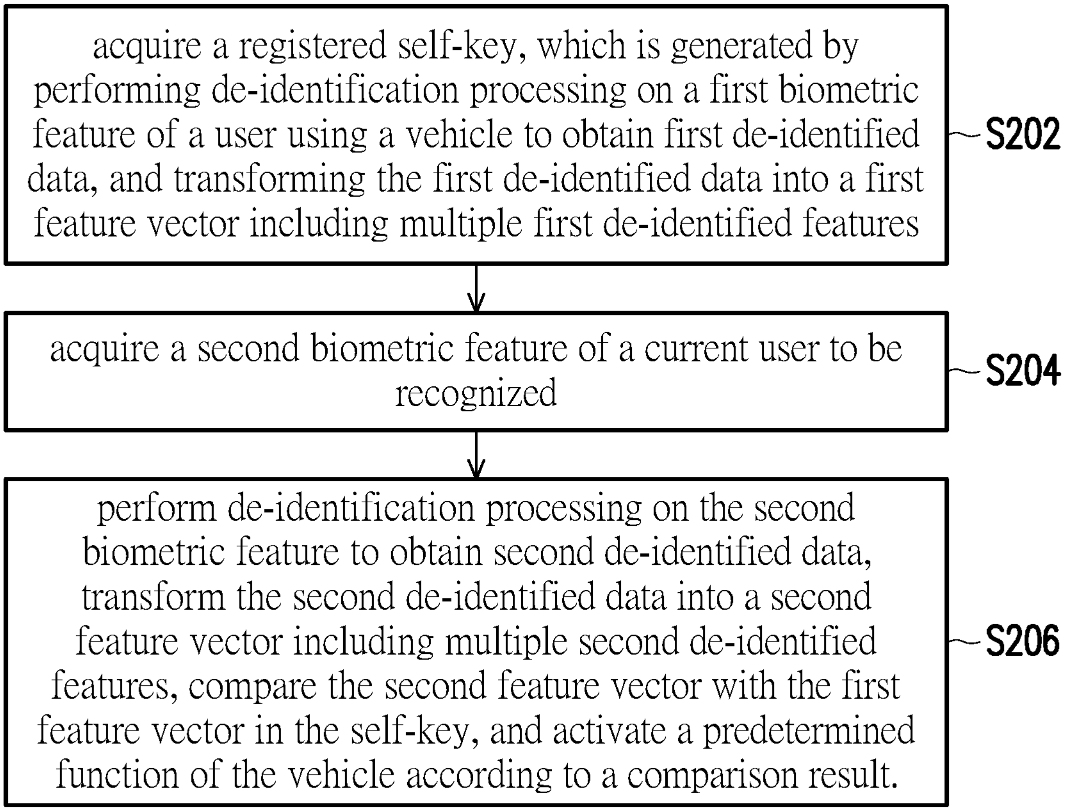
FIG. 2 is a flowchart of an operation method of the vehicle-mounted system 10 according to an embodiment of the present disclosure.

FIG. 2 is a flowchart of an operation method of the vehicle-mounted system 10 according to an embodiment of the present disclosure. Referring to FIG. 1 and FIG. 2 simultaneously, the operation method of this embodiment is applicable to the vehicle-mounted system 10 of FIG. 1.

In step S202, the processor 13 of the vehicle-mounted system 10 acquires a registered self-key by using the data acquisition device 11. The self-key is, for example, generated by performing de-identification processing on a first biometric feature of a user using the vehicle to obtain a first de-identified data, and transforming the first de-identified data into a first feature vector including multiple first de-identified features. The user of the vehicle is, for example, the driver of the vehicle, the driver's family or friends, etc., and the present disclosure is not limited thereto.

Figure 2A:
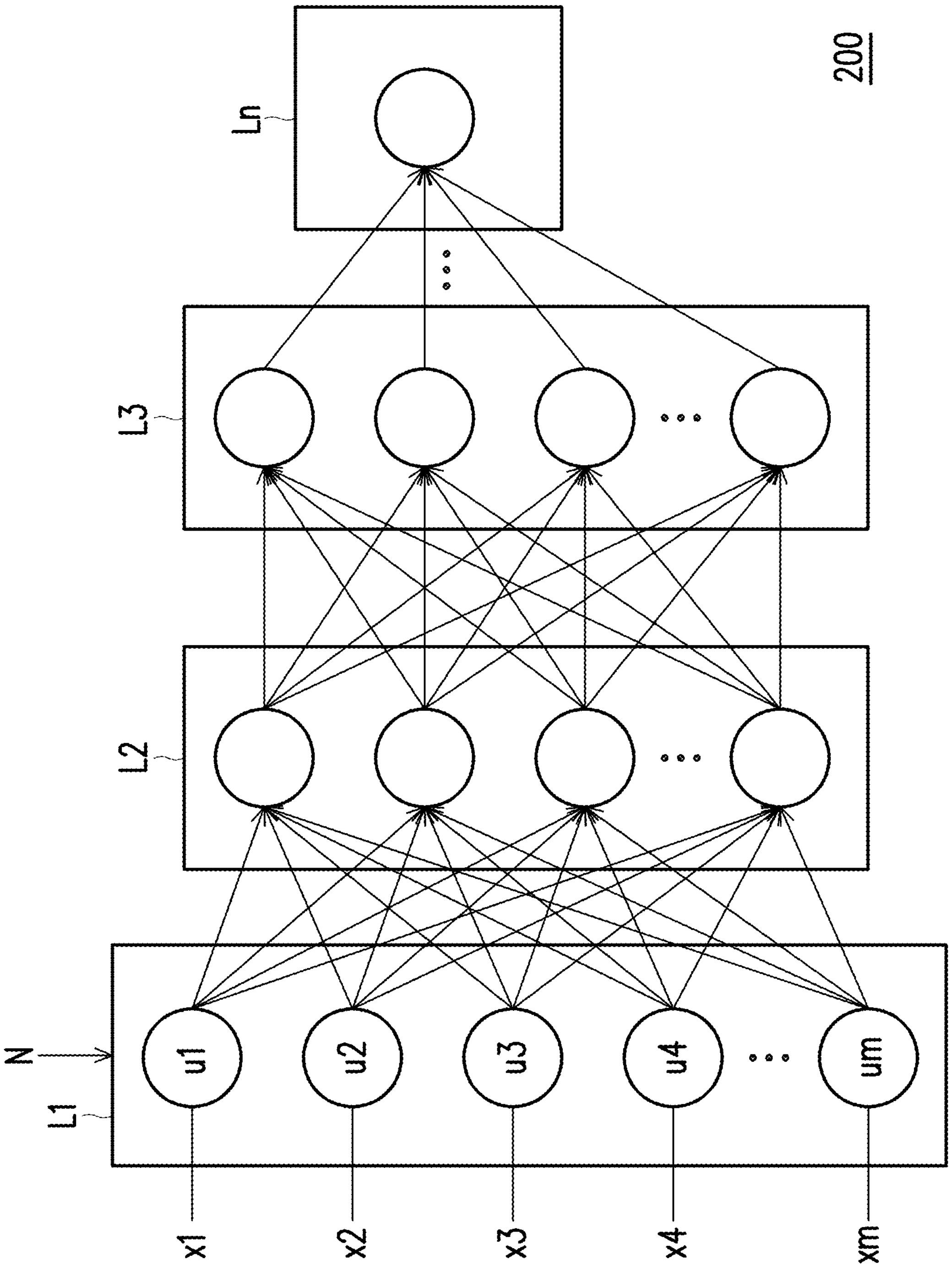
FIG. 2*a* is a diagram illustrating a structure of a deep learning model according to an embodiment of the present disclosure.

In some embodiments, the processor 13 employs a deep learning model that supports privacy protection technology to perform de-identification processing on the first biometric feature. The deep learning model includes multiple neurons divided into multiple layers, in which the first biometric feature is transformed into feature values of a plurality of neurons at a layer among the multiple layers, and the transformed feature value of each neuron is added to the noise generated using a privacy parameter and then input into the next layer. After multiple layers of processing, the de-identified data is obtained. The above-mentioned privacy protection technologies include differential privacy, homomorphic encryption, shuffle or pixelate, but the present disclosure is not limited thereto. For example, as shown in FIG. 2*a*, a deep learning model 200 includes multiple neurons divided into multiple layers L1 to Ln (n is an integer larger than one), in which the first biometric feature is transformed into feature values x1 to xm (m is an integer larger than one) of the neurons u1 to um at the layer L1 among the layers L1 to Ln, and the transformed feature value of each neuron is added to the noise N generated using a privacy parameter and then input into the next layer L2.

In detail, the deep learning model of this embodiment is a neural network model that performs privacy protection through the privacy protection algorithm of feature domain operation, that is, $N_{x_i}+N(0, \varepsilon^2)$, wherein $N_{x_i}$ is the specific data in the neural network, and N is the noise calculated using a noise distribution or permutation algorithm with a privacy parameter ε. It should be noted that $N_{x_i}$ is variable, which may be adjusted by a neural layer according to computing resources, privacy loss and model quality.

In step S204, the processor 13 acquires, by using the biometric feature acquisition device 12, a second biometric feature of a current user to be recognized. The second biometric feature is, for example, the current user's image, voice, fingerprints, palm prints, iris, retina, veins, etc., which is the same as or corresponding to the first biometric feature used to generate the self-key, and can be used to verify the identity of the current user.

In step S206, the processor 13 performs the de-identification processing on the second biometric feature to obtain a second de-identified data, transforms the second de-identified data into a second feature vector including multiple second de-identified features, compares the second feature vector with the first feature vector in the self-key, and activates a predetermined function of the vehicle according to a comparison result.

The processor 13 also employs the deep learning model that supports privacy protection technology to perform de-identification processing and feature transformation on the second biometric feature. Such de-identification processing and feature transformation are the same as or corresponding to the de-identification processing and the feature transformation used to generate the self-key mentioned above. By comparing the feature vector obtained by the de-identification processing and the feature conversion with the feature vector in the acquired self-key, the processor 13 can finally verify whether the current user is the registered user himself, thereby activating the predetermined function of the vehicle.

In some embodiments, the processor 13 may further monitor a variation of the second biometric feature to determine a state of the current user, and activate another function of the vehicle according to a determination result. For example, the processor 13 may capture a face image of a driver by using the biometric feature acquisition device 12, determine whether the driver is dozing off by monitoring a variation of the face images, and when determining the driving state is fatigue, issue a warning message to remind the driver to pay attention.

In some embodiments, the processor 13 may set different authorization data for different users of the vehicle in which each authorization data corresponds to different predetermined function of the vehicle, and store the set authorization data in a storage device (not shown), such that when the identity of the user is recognized, the processor 13 can activate, the predetermined function of the vehicle allowed in the authorization data assigned to the identity according to the authorization data. For example, if the identity of the current user is recognized as the driver, a starting function of the vehicle can be activated so that the current user can start the engine by pressing the start button; if the identity of the current user is recognized as a family member, an audio and video function of the vehicle can be activated so that the current user can operate an audio and video interface of the vehicle; and if the current identity of the current user is recognized as not being a registered user, an alarm of the vehicle can be activated, so as to deter outsiders from intruding or damaging the vehicle.

In some embodiments, the biometric feature acquisition device 12 may be placed outside the vehicle to acquire the biometric features of an external user. The processor 13 can perform de-identification processing on the biometric features to obtain de-identified data, and transform the de-identified data into a feature vector containing multiple de-identified features, and compare it with the feature vector in self-key, so as to open the vehicle door based on the comparison result. Since the external user's biometric features acquired by the biometric feature acquisition device 12 have undergone the de-identification processing, even if the external user is a passerby, his privacy will not be infringed.

The method of this embodiment uses the above-mentioned de-identification processing to de-identify the vehicle user's face, fingerprints and other biometric information and stores it in the vehicle-mounted system itself or other external devices, thereby achieving traceless identification. Besides, the method can activate different predetermined functions of the vehicle in response to different security requirements or usage rights, so as to achieve a flexible balance.

Figure 3A:
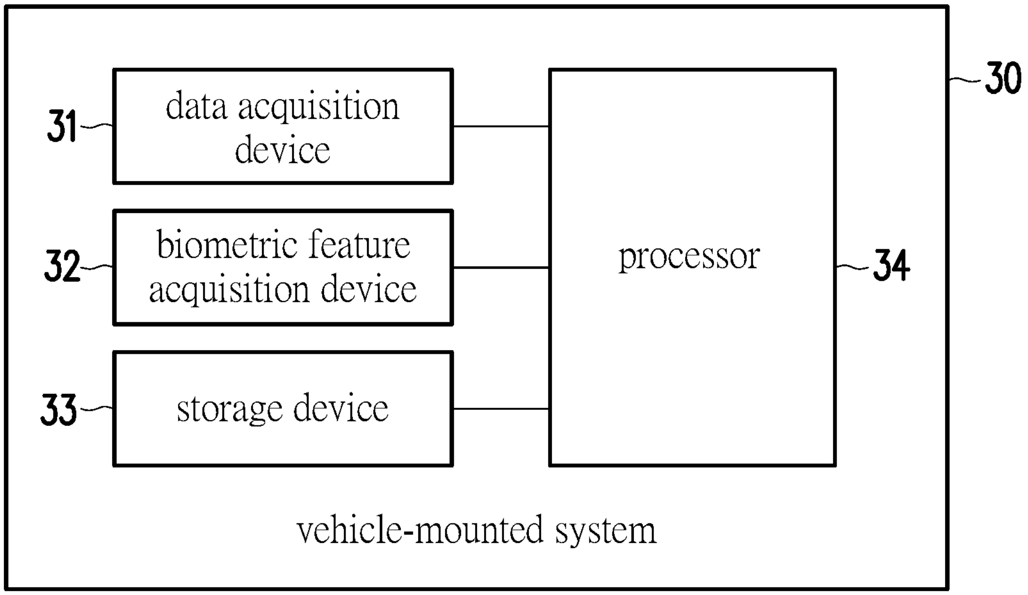
FIG. 3A is a block diagram of a vehicle-mounted system 30 according to an embodiment of the present disclosure.
Figure 3B:
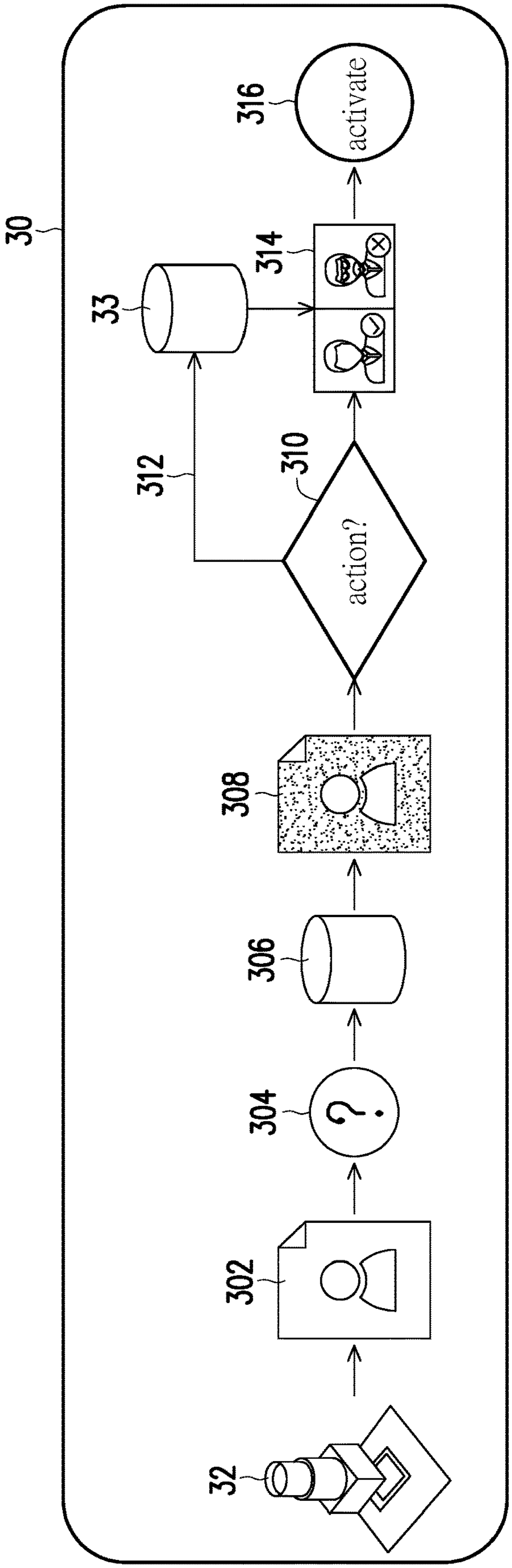
FIG. 3B is a flowchart of an operation method of the vehicle-mounted system 30 according to an embodiment of the present disclosure.

FIG. 3A is a block diagram of a vehicle-mounted system 30 according to an embodiment of the present disclosure, and FIG. 3B is a flowchart of an operation method of the vehicle-mounted system 30 according to an embodiment of the present disclosure. Referring to FIG. 3A first, the vehicle-mounted system 30 of the embodiment includes a data acquisition device 31, a biometric feature acquisition device 32, a storage device 33, and a processor 34, in which the type and the function of the data acquisition device 31, the biometric feature acquisition device 32, and the processor 34 are the same as or similar to those of the data acquisition device 11, the biometric feature acquisition device 12 and the processor 13 in the aforesaid embodiment, and therefore the details thereof are omitted herein.

Different from the aforesaid embodiment, the vehicle-mounted system 30 of the embodiment includes the storage device 33, which is, for example, any type of fixed or removable random access memory (RAM), a read-only memory (ROM), a flash memory, a hard disk or similar components or a combination of the above components, and is configured to store the self-key generated by the processor 34.

In detail, referring to FIG. 3B, the operation method of the vehicle-mounted system 30 of the embodiment is divided into a registration stage and an identification stage.

In the registration stage, the processor 34 of the vehicle-mounted system 30 may acquire the biometric feature 302 of the user of the vehicle by using the biometric feature acquisition device 32. The user of the vehicle is, for example, the driver of the vehicle, the driver's family or friends, etc., and the present disclosure is not limited thereto.

In some embodiments, the processor 34 may employ an image acquisition device to acquire images of the vehicle user, and execute a face recognition algorithm on the acquired images to obtain a face image of the vehicle user and use the face image as the biometric features 302 of the vehicle user. In other embodiments, the processor 34 may also employ other biometric sensors to detect the vehicle user's voice, fingerprints, palm prints, iris, retina, and veins to server as the biometric features 302 of the vehicle user, and the present disclosure is not limited thereto.

Next, the processor 34 employs the biometric identification technology to perform the biometric identification 304. The biometric identification technology includes blink detection, deep learning features, challenge-response technology or three-dimensional stereo cameras, but is not limited thereto.

In some embodiments, the processor 34 may use the images acquired by the image acquisition device to perform biometric identification. In other embodiments, the processor 34 may use the biometric features 302 detected by other biometric sensors to perform the biometric identification, and the embodiment provides no limitation to the implementation of biometric identification. As such, the embodiment can prevent others from obtaining the vehicle user's image or other biometric features in advance and using the image or biometric features to deceive the system.

If it is identified that there is a living body in the biometric feature 302, the processor 34 will employ the deep learning model 306 that supports privacy protection technology to perform the de-identification processing on the biometric feature 302, so as to obtain the de-identified data 308, and transform the de-identified data 308 into a feature vector including a plurality of de-identified features. The above-mentioned privacy protection technology includes differential privacy, homomorphic encryption, shuffle or pixelate, but is not limited thereto.

If the action 310 is determined as registration, the feature vector is stored in the storage device 33 as the self-key 312. The action 310 is, for example, determined based on the current user's operation on the vehicle-mounted system 30. For example, if the user enters the vehicle's identification code or security verification code on the vehicle-mounted system 30, or uses a mobile device that has installed a specified application and logged in to an account to connect to the vehicle-mounted system 30, then the processor 34 of the vehicle-mounted system 30 can determine that the current action 310 is registration. On the contrary, if the user does not perform the above operation, the processor 34 may determine that the current action 310 is identification.

In the identification stage, the processor 34 of the vehicle-mounted system 30 also acquires the biometric features 302 of the current user by using the biometric feature acquisition device 32, and uses the biometric identification technology to perform biometric identification 304. If it is identified that there is a living body in the biometric feature 302, the processor 34 will use the deep learning model 306 that supports privacy protection technology to perform de-identification processing on the biometric feature 302 to obtain de-identified data 308, and transform the de-identified data 308 into a feature vector containing multiple de-identified features.

If the action 310 is determined as identification, the feature vector is compared with the feature vector in the self-key 312 stored in the storage device 33, so as to verify the identity of the current user based on the comparison result 314. If the comparison result 314 is consistent, it can be confirmed that the identity of the current user is legal, thereby activating the predetermined function 316 of the vehicle. Otherwise, it is confirmed that the identity of the current user is illegal, thereby prohibiting the activation of the predetermined function 316 or issuing an alarm.

Figure 4A:
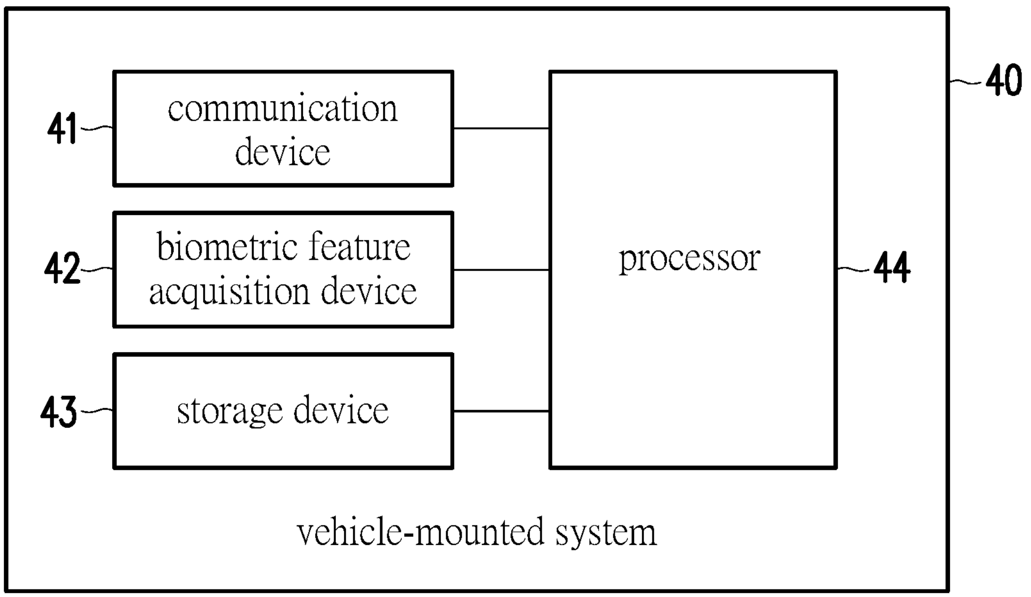
FIG. 4A is a block diagram of a vehicle-mounted system 40 according to an embodiment of the present disclosure.
Figure 4B:
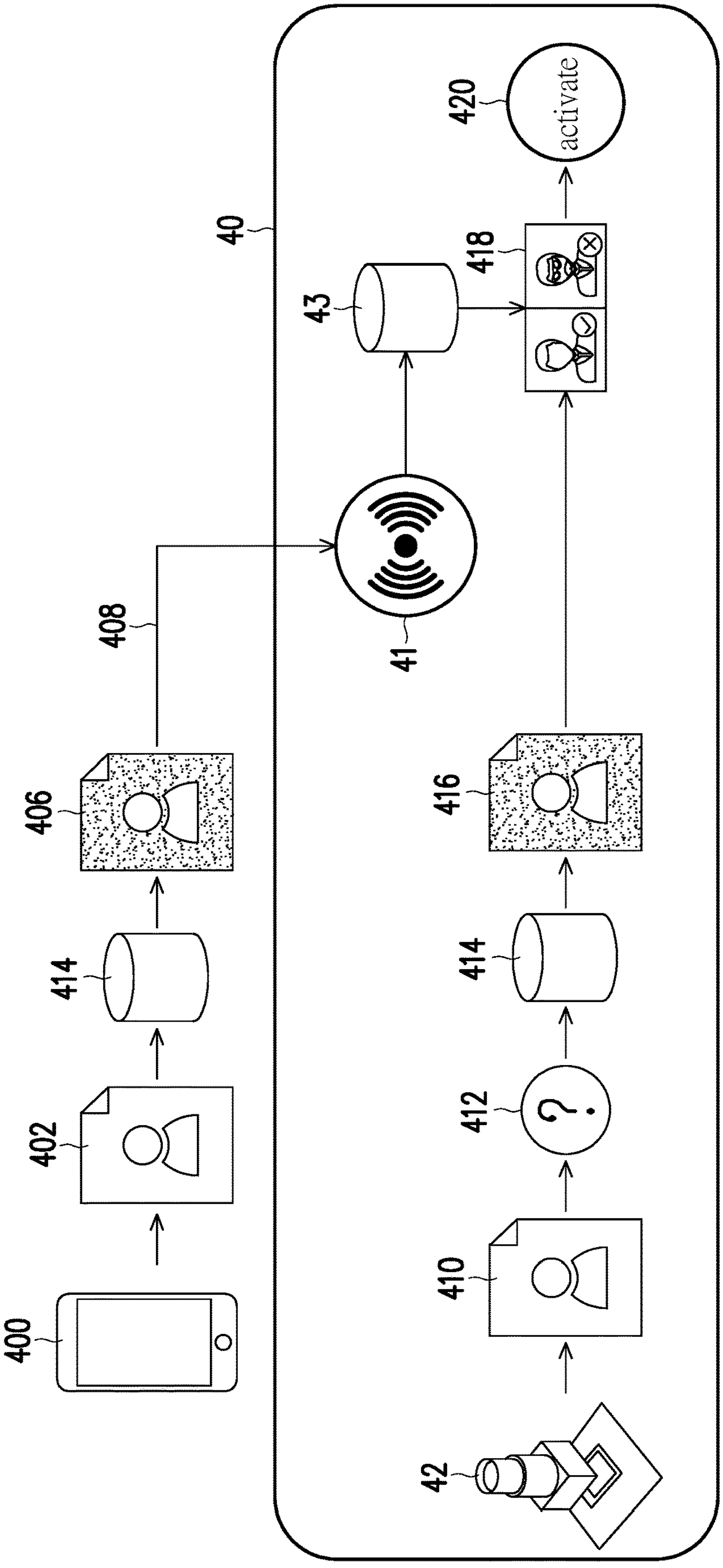
FIG. 4B is a flowchart of an operation method of the vehicle-mounted system 40 according to an embodiment of the present disclosure.

FIG. 4A is a block diagram of a vehicle-mounted system 40 according to an embodiment of the present disclosure, and FIG. 4B is a flowchart of an operation method of the vehicle-mounted system 40 according to an embodiment of the present disclosure. Referring to FIG. 4A first, the vehicle-mounted system 40 of the embodiment includes a communication device 41, a biometric feature acquisition device 42, a storage device 43, and a processor 44, in which the type and the function of the biometric feature acquisition device 42, the storage device 43, and the processor 44 are the same as or similar to those of the biometric feature acquisition device 32, the storage device 33, and the processor 34 in the aforesaid embodiment, and therefore the details thereof are omitted herein.

Different from the aforesaid embodiment, the vehicle-mounted system 40 of the embodiment includes the communication device 41, which is, for example, a communication device that supports communication protocols such as wireless fidelity (Wi-Fi), Wi-Fi direct, radio frequency identification (RFID), Bluetooth, infrared, near-field communication (NFC) or device-to-device (D2D), or a network connection device that supports Internet connection, and is configured to perform communication or network connection with the mobile device of the vehicle user, and acquire data from the mobile device.

In detail, referring to FIG. 4B, the operation method of the vehicle-mounted system 40 of the embodiment is divided into a registration stage and an identification stage.

In the registration stage, the vehicle user uses his or her mobile device 400 to acquire his or her biometric feature 402. In some embodiments, the mobile device 400 may employ an image acquisition device to acquire images of the vehicle user, and execute a face recognition algorithm on the acquired images to obtain a face image of the vehicle user and use the face image as the biometric features 402 of the vehicle user. In other embodiments, the mobile device 400 may also employ other biometric sensors to detect the vehicle user's voice, fingerprints, palm prints, iris, retina, and veins to server as the biometric features 402 of the vehicle user, and the present disclosure is not limited thereto.

Next, the mobile device 400 employs a deep learning model 404 that supports privacy protection technology to perform de-identification processing on the biometric feature 402 to obtain de-identified data 406, and transforms the de-identified data 406 into a feature vector that includes a plurality of de-identified features.

In the identification stage, the processor 44 of the vehicle-mounted system 40 establishes a connection 408 with the mobile device 400 by using the communication device 41, receives the self-key of the mobile device 400 through the connection 408, and stores the self-key in the storage device 43. On the other hand, the processor 44 of the vehicle-mounted system 40 acquires the biometric features 410 of the current user by using the biometric feature acquisition device 42, and uses the biometric identification technology to perform biometric identification 412. If it is identified that there is a living body in the biometric feature 410, the processor 44 will use the deep learning model 414 that supports privacy protection technology to perform de-identification processing on the biometric feature 410 to obtain de-identified data 416, transform the de-identified data 416 into a feature vector containing multiple de-identified features, compare the feature vector with the feature vector in the self-key stored in the storage device 43, and verify the identity of the current user based on the comparison result 418. If the comparison result 418 is consistent, it can be confirmed that the identity of the current user is legal, thereby activating the predetermined function 420 of the vehicle. Otherwise, it is confirmed that the identity of the current user is illegal, thereby prohibiting the activation of the predetermined function 420 or issuing an alarm.

Figure 5A:
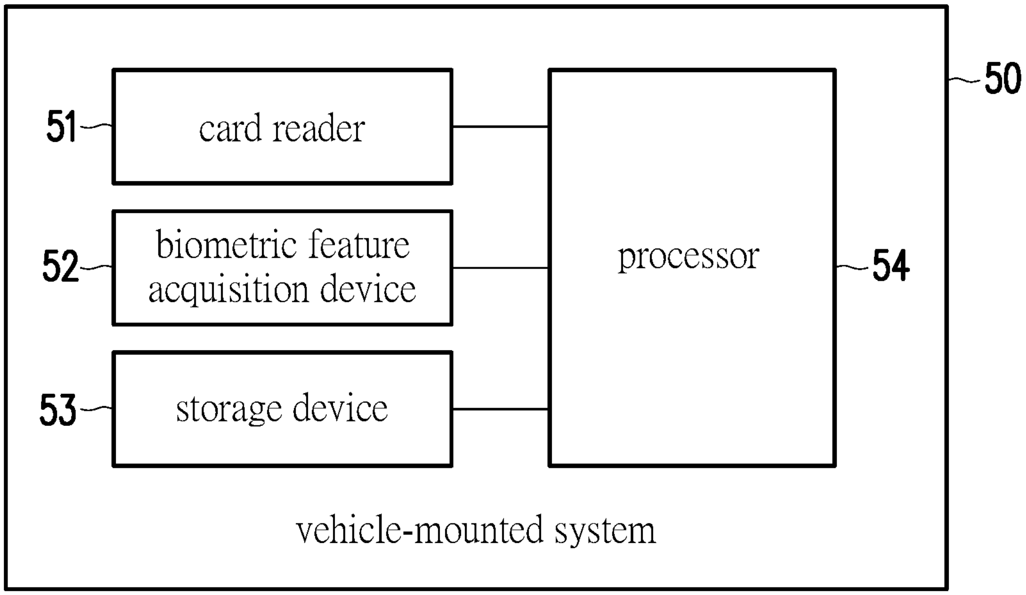
FIG. 5A is a block diagram of a vehicle-mounted system 40 according to an embodiment of the present disclosure.
Figure 5B:
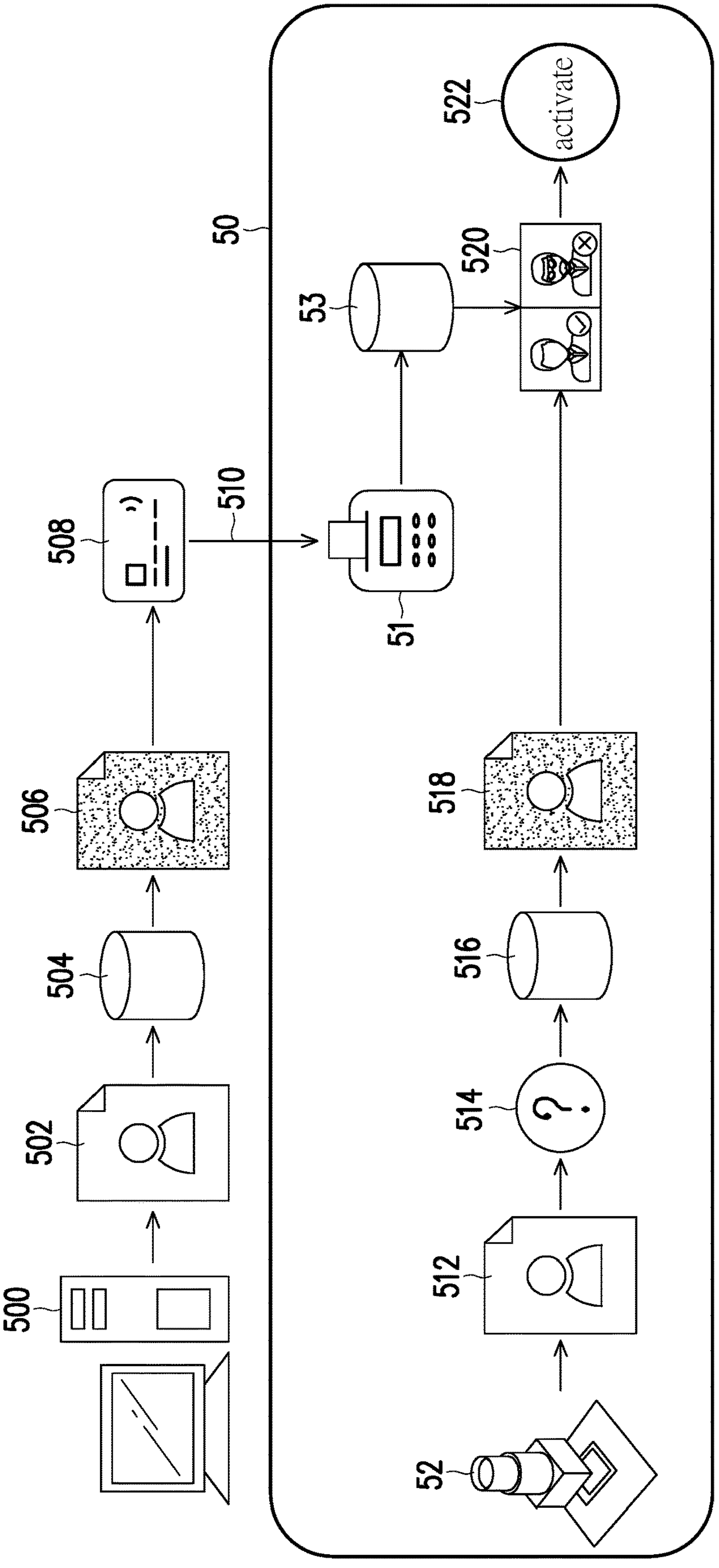
FIG. 5B is a flowchart of an operation method of the vehicle-mounted system 40 according to an embodiment of the present disclosure.

FIG. 5A is a block diagram of a vehicle-mounted system 50 according to an embodiment of the present disclosure, and FIG. 5B is a flowchart of an operation method of the vehicle-mounted system 50 according to an embodiment of the present disclosure. Referring to FIG. 5A first, the vehicle-mounted system 50 of the embodiment includes a card reader 51, a biometric feature acquisition device 52, a storage device 53, and a processor 54, in which the type and the function of the biometric feature acquisition device 52, the storage device 53, and the processor 54 are the same as or similar to those of the biometric feature acquisition device 32, the storage device 33, and the processor 34 in the aforesaid embodiment, and therefore the details thereof are omitted herein.

Different from the aforesaid embodiment, the vehicle-mounted system 50 of the embodiment includes the card reader 51, which is, for example, a chip card reader or a memory card reader and can be used to read data stored in a flash drive, a memory card such as Secure Digital Memory Card (SD Card), or a portable storage device such as a chip card, which is not limited herein.

In detail, referring to FIG. 5B, the operation method of the vehicle-mounted system 50 of the embodiment is divided into a registration stage and an identification stage.

In the registration stage, the vehicle user uses his or her computer device 500 such as personal computer, laptop, or tablet PC to acquire his or her biometric feature 502. In some embodiments, the computer device 500 may employ an image acquisition device to acquire images of the vehicle user, and execute a face recognition algorithm on the acquired images to obtain a face image of the vehicle user and use the face image as the biometric features 502 of the vehicle user. In other embodiments, the computer device 500 may also employ other biometric sensors to detect the vehicle user's voice, fingerprints, palm prints, iris, retina, and veins to server as the biometric features 502 of the vehicle user, and the present disclosure is not limited thereto.

Next, the computer device 500 employs a deep learning model 504 that supports privacy protection technology to perform de-identification processing on the biometric feature 502 to obtain de-identified data 506, transforms the de-identified data 506 into a feature vector that includes a plurality of de-identified features, and write the feature vector into the chip card, the memory card or the portable storage device. The above-mentioned privacy protection technology includes differential privacy, homomorphic encryption, shuffle or pixelate, but is not limited thereto.

In the identification stage, the processor 54 of the vehicle-mounted system 50 reads the self-key stored in the portable storage device 508 by using the card reader 51, and stores the self-key in the storage device 53. On the other hand, the processor 54 of the vehicle-mounted system 50 acquires the biometric features 512 of the current user by using the biometric feature acquisition device 52, and uses the biometric identification technology to perform biometric identification 514. If it is identified that there is a living body in the biometric feature 512, the processor 54 will use the deep learning model 516 that supports privacy protection technology to perform de-identification processing on the biometric feature 512 to obtain de-identified data 518, transform the de-identified data 518 into a feature vector containing multiple de-identified features, compare the feature vector with the feature vector in the self-key stored in the storage device 53, and verify the identity of the current user based on the comparison result 520. If the comparison result 520 is consistent, it can be confirmed that the identity of the current user is legal, thereby activating the predetermined function 522 of the vehicle. Otherwise, it is confirmed that the identity of the current user is illegal, thereby prohibiting the activation of the predetermined function 522 or issuing an alarm.

In summary, the vehicle-mounted system and the operation method thereof of the present disclosure have the following advantages:

High security: The deep learning model that supports privacy protection technology is used to perform de-identification processing on the biometric features, and registration and verification are performed on the de-identified data that undergoes the de-identification processing to protect user's privacy, and the de-identified feature vector cannot be restored back to the original biometric feature, thus preventing the risks of data leakage and identity theft.

Protect user privacy: The de-identified data is stored in the vehicle-mounted system or a user's portable device to avoid storing data in third-party systems, thereby improving the privacy protection of user's personal data.

Convenience and flexibility: The de-identified data is stored in the user's mobile device or portable storage device such that the user can perform identity verification by using a mobile phone or a chip card, thereby providing good user experience with convenience.

Prevention of hacking: After the feature vector of de-identified data is stored, even if the mobile phone is hacked, in the absence of real face images or biometrics, identity verification cannot be performed, thereby increasing the security of the system.

Two-factor verification: The processing of identity verification requires a real face image or biometric feature of an authorized user. The two-factor verification mechanism may improve security and prevent attacks from one single factor.

Real-time identification: Through performing real-time identification on the user's biometric feature through de-identification processing, it is possible to quickly complete the verification and provide real-time services.

Reduce the risk of data leakage: There is no need to transmit real face images or biometric features to an external server for verification, thereby reducing the risk of data leakage caused by data transmission.

Non-trace mode: After real-time identification is completed, no current information will be left.

No feature database is required: The personal feature information has been stored in the user's own user device. There is no need for the system to provide a centralized database, thereby improving practicality and saving costs for storage space.

Although the present disclosure has been disclosed in the above embodiments, they are not intended to limit the present disclosure. Anyone with ordinary knowledge in the technical field can make some modifications and refinement without departing from the spirit and scope of the present disclosure, so the protection scope of the present disclosure shall be determined by the appended claims.

What is claimed is:

1. A vehicle-mounted system, disposed in a vehicle, comprising:

a data acquisition device, acquiring a registered self-key, wherein the self-key is generated by performing de-identification processing on a first biometric image of a user using the vehicle to obtain a first de-identified data, and transforming the first de-identified data into a first feature vector including a plurality of first de-identified features;

a first biometric image acquisition device, acquiring a second biometric image of a current user to be recognized; and a processor, coupled to the data acquisition device and the first biometric image acquisition device, and configured to perform the de-identification processing on the second biometric image to obtain a second de-identified data, transform the second de-identified data into a second feature vector including a plurality of second de-identified features, compare the second feature vector with the first feature vector in the self-key, and activate a predetermined function of the vehicle according to a comparison result, wherein the processor further employs a deep learning model that supports a privacy protection technology to perform the de-identification processing on the second biometric image.

2. The vehicle-mounted system according to claim 1, further comprising:

a storage device, storing the self-key, wherein the processor acquires, by using the first biometric image acquisition device, the first biometric image of the user using the vehicle, performs the de-identification processing on the first biometric image to obtain the first de-identified data, transforms the first de-identified data into the first feature vector including the plurality of first de-identified features, and stores the first feature vector as the self-key in the storage device.

3. The vehicle-mounted system according to claim 1, further comprising:

a communication device, acquiring the self-key from a mobile device of the user using the vehicle through wired communication or wireless communication, wherein the mobile device acquires, by using a second biometric image acquisition device, the first biometric image of the user using the vehicle, performs the de-identification processing on the first biometric image to obtain the first de-identified data, and transforms the first de-identified data into the first feature vector including the plurality of first de-identified features to generate the self-key.

4. The vehicle-mounted system according to claim 1, further comprising:

a card reader, acquiring the self-key from a portable storage device of the user using the vehicle, wherein the self-key is generated by a computer device of the user using the vehicle through acquiring, by using a second biometric image acquisition device, the first biometric image of the user using the vehicle, performs the de-identification processing on the first biometric image to obtain the first de-identified data, and transforms the first de-identified data into the first feature vector including the plurality of first de-identified features, and is written into the portable storage device.

5. The vehicle-mounted system according to claim 1, wherein the processor comprises recognizing an identity of the current user according to the comparison result, and activating the predetermined function of the vehicle allowed to be used in authorization data according to the authorization data set in advance.

6. The vehicle-mounted system according to claim 1, wherein the processor further monitors a variation of the second biometric image to determine a state of the current user, and activates another predetermined function of the vehicle according to a determination result.

7. The vehicle-mounted system according to claim 1, wherein the first biometric image acquisition device is configured outside the vehicle to acquire a third biometric feature of an external user, and wherein the processor further performs the de-identification processing on the third biometric image to obtain a third de-identified data, transforms the third de-identified data into a third feature vector including a plurality of third de-identified features, compares the third feature vector with the first feature vector in the self-key, and opens a door of the vehicle according a comparison result.

8. The vehicle-mounted system according to claim 1, wherein the deep learning model comprises a plurality of neurons divided into multiple layers, the second biometric image is transformed into feature values of a plurality of neurons at a layer among the multiple layers, and the transformed feature value of each of the plurality of neurons is added to a noise generated using a privacy parameter and then input into a next layer, after the multiple layers of processing, the second de-identified data is obtained.

9. The vehicle-mounted system according to claim 1, wherein the processor further employs a biometric identification technology to identify a living body in the second biometric image, and, when identifying that there is the living body in the second biometric image, performs the de-identification processing on the second metric image, wherein the biometric identification technology comprises a blink detection, deep learning features, a challenge-response technology or a three-dimensional stereo camera.

10. An operation method of a vehicle-mounted system, adapted for a vehicle-mounted system disposed in a vehicle and comprising a data acquisition device, a first biometric image acquisition device, and a processor, the method comprising:

acquiring, by the data acquisition device, a registered self-key, wherein the self-key is generated by performing de-identification processing on a first biometric image of a user using the vehicle to obtain a first de-identified data, and transforming the first de-identified data into a first feature vector including a plurality of first de-identified features;

acquiring, by the first biometric image acquisition device, a second biometric image of a current user to be recognized; and performing, by the processor, the de-identification processing on the second biometric image to obtain a second de-identified data, transforming the second de-identified data into a second feature vector including a plurality of second de-identified features, comparing the second feature vector with the first feature vector in the self-key, and activating a predetermined function of the vehicle according to a comparison result, wherein the step of performing, by the processor, the de-identification processing on the second biometric image to obtain the second de-identified data comprises:

employing, by the processor, a deep learning model that supports a privacy protection technology to perform the de-identification processing on the second biometric image.

11. The method according to claim 10, wherein the vehicle-mounted system further comprises a storage device storing the self-key, and the method further comprises:

acquiring, by using the first biometric image acquisition device, the first biometric image of the user using the vehicle, performing the de-identification processing on the first biometric image to obtain the first de-identified data, transforming the first de-identified data into the first feature vector including the plurality of first de-identified features, and storing the first feature vector as the self-key in the storage device.

12. The method according to claim 10, wherein the data acquisition device comprises a communication device, and the method further comprises:

acquiring, by the communication device, the self-key from a mobile device of the user using the vehicle through wired communication or wireless communication, wherein the mobile device acquires, by using a second biometric image acquisition device, the first biometric image of the user using the vehicle, performs the de-identification processing on the first biometric image to obtain the first de-identified data, and transforms the first de-identified data into the first feature vector including the plurality of first de-identified features to generate the self-key.

13. The method according to claim 10, wherein the data acquisition device comprises a card reader, and the method further comprises:

acquiring, by the card reader, the self-key from a portable storage device of the user using the vehicle, wherein the self-key is generated by a computer device of the user using the vehicle through acquiring, by using a second biometric image acquisition device, the first biometric image of the user using the vehicle, performing the de-identification processing on the first biometric image to obtain the first de-identified data, and transforming the first de-identified data into the first feature vector including the plurality of first de-identified features, and is written into the portable storage device.

14. The method according to claim 10, wherein the step of activating, by the processor, the predetermined function of the vehicle according to the comparison result comprises:

recognizing, by the processor, an identity of the current user according to the comparison result, and activating the predetermined function of the vehicle allowed to be used in authorization data according to the authorization data set in advance.

15. The method according to claim 10, further comprising:

monitoring, by the processor, a variation of the second biometric image to determine a state of the current user, and activating another predetermined function of the vehicle according to a determination result.

16. The method according to claim 10, wherein the first biometric image acquisition device is disposed outside the vehicle, and the method further comprises:

acquiring, by the processor using the first biometric image acquisition device, a third biometric image of an external user; and performing, by the processor, the de-identification processing on the third biometric image to obtain a third de-identified data, transforming the third de-identified data into a third feature vector including a plurality of third de-identified features, comparing the third feature vector with the first feature vector in the self-key, and opening a door of the vehicle according a comparison result.

17. The method according to claim 10, wherein the deep learning model comprises a plurality of neurons divided into multiple layers, the second biometric image is transformed into feature values of a plurality of neurons at a layer among the multiple layers, and the transformed feature value of each of the plurality of neurons is added to a noise generated using a privacy parameter and then input into a next layer, after the multiple layers of processing, the second de-identified data is obtained.

18. The method according to claim 10, further comprising:

employing, by the processor, a biometric identification technology to identify a living body in the second biometric image, and, when identifying that there is the living body in the second biometric image, performing the de-identification processing on the second biometric image, wherein the biometric identification technology comprises a blink detection, deep learning features, a challenge-response technology or a three-dimensional stereo camera.

* * * * *